United States Patent Office 3,013,075
Patented Dec. 12, 1961

3,013,075
BROMOANHYDRO-12a-BROMO-12a-DEOXYDEDI-
METHYLAMINOTETRACYCLINE
James Howard Boothe, Montvale, N.J., and Arthur
Green, Zurich, Switzerland, assignors to American Cy-
anamid Company, New York, N.Y., a corporation of
Maine
No Drawing. Filed Nov. 26, 1958, Ser. No. 776,435
4 Claims. (Cl. 260—559)

This invention relates to a new compound of the tetra-
cycline series and more particularly is concerned with
bromoanhydro - 12a bromo - 12a - deoxydedimethyl-
aminotetracycline of the formula:

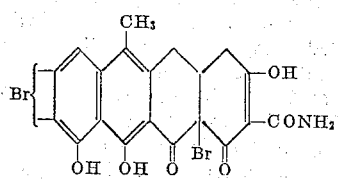

An appropriate chemical name for this compound ac-
cording to Chemical Abstracts nomenclature would be 8
(or 9), 12a-dibromo-1,4,4a,5,12,12a-hexahydro-3,10,11-
trihydroxy - 6 - methyl - 1,12 - dioxo - 2 - naphthacene-
carboxamide.

The new compound of this invention is prepared by
a series of reactions starting with 12a-deoxydedimethyl-
aminotetracycline. This compound is prepared by con-
tacting tetracycline with metallic zinc in a mildly acidic
media, i.e., glacial acetic acid, for a period of at least 72
hours. This reaction results in the elimination of the
hydroxyl group at the 12a-position of the tetracycline
nucleus and in the elimination of the dimethylamino group
at the 4-position of the tetracycline nucleus. The result-
ing compound may be termed 12a-deoxydedimethylamino-
tetracycline. This reaction using chlortetracycline as the
starting material and resulting in 12a-deoxydedimethyl-
aminochlortetracycline is described in the Journal of the
American Chemical Society 76, 3574 (1954).

The 12a-deoxydedimethylaminotetracycline produced
as above-described is reacted with a suitable quantity of
N-bromosuccinimide in a suitable organic solvent such as
chloroform, carbon tetrachloride, methylene chloride,
ether, 1,2-dimethoxyethane, etc. The reaction may be
carried out at temperatures ranging from about 5° C. to
about 40° C. When approximately one equivalent of
N-bromosuccinimide is used, 12a-bromo-12a-deoxydedi-
methylaminotetracycline is formed as the predominant
product. When two equivalents of the brominating agent
are used 11a,12a-dibromo-12a-deoxydedimethylaminotet-
racycline is formed as the predominant product.

This reaction may be illustrated schematically below
using 12a-deoxydedimethylaminotetracycline as the start-
ing material.

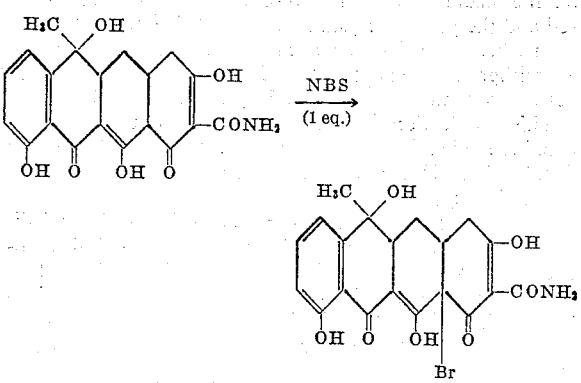

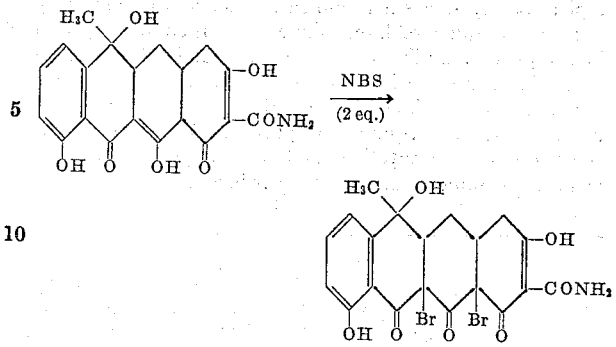

The 12a-bromo-12a-deoxydedimethylaminotetracycline
produced as above-described is then converted to the
corresponding anhydro compound by treatment with a
dehydrating agent such as any strong mineral acid, i.e.,
hydrogen bromide, hydrogen chloride, hydrogen iodide,
sulfuric acid, phosphoric acid, or such common dehydrat-
ing agents as thionyl chloride, phosphorus oxychloride
and the like. This compound, anhydro-12a-bromo-12a-
deoxydedimethylaminotetracycline has the following
formula:

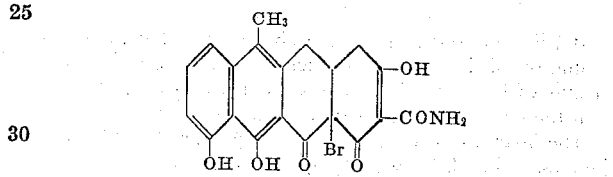

and which according to Chemical Abstracts nomenclature
may be termed 12a-bromo-1,4,4a,5,12,12a-hexahydro-3,
10,11 - trihydroxy - 6-methyl-1,12-dioxo-2-naphthacene-
carboxamide. Preferably, the reaction is carried out in
a suitable solvent such as a lower alkanoic acid, i.e., gla-
cial acetic acid, propionic acid, etc., or such solvents as
lower alcohols, 1,2-dimethoxyethane, 2-methoxyethanol
or 2-ethoxyethanol. The dehydration proceeds smooth-
ly at temperatures ranging from about 0° C. to about 100°
C. and results in good yields of anhydro-12a-bromo-12a-
deoxydedimethylaminotetracycline. Preferably hydrogen
bromide is used as the dehydrating agent, but the other
acids listed above may be used for the dehydration.

The anhydro - 12a - bromo - 12a - deoxydedimethyl-
aminotetracycline so-produced is then brominated with
an excess of one equivalent of N-bromosuccinimide in
a suitable solvent such as chloroform, carbon tetrachlo-
ride, methylene chloride, ether, 1,2-dimethoxyethane, etc.
to form the final compound bromoanhydro-12a-bromo-
12a-deoxydedimethylaminotetracycline.

An alternative preparation for the final compound in-
volves the use of 11a,12a-dibromo-12a-deoxydedimethyl-
aminotetracycline. This compound produced as de-
scribed above may be subjected to dehydration in the
same manner as described hereinbefore with respect to
12a - bromo - 12a - deoxydedimethylaminotetracycline to
produce bromoanhydro - 12a - bromo - 12a - deoxydedi-
methylaminotetracycline directly. During the course of
this dehydration reaction, the bromine in the 11a-position
apparently migrates to either the 8- or 9-position of the D
ring of the tetracycline ring system.

Bromoanhydro-12a-bromo-12a-deoxydedimethylamino-
tetracycline is biologically active and possesses activity
against a variety of gram-positive and gram-negative
microorganisms. The antibacterial spectrum of this com-
pound is similar in many respects to that of tetracycline
except that, in general, it has a somewhat lower order of
activity. It is of value, however, in that it is effective
against certain tetracycline-resistant strains of bacteria
such as Streptococcus γ No. 11, Staphylococcus albus No.
69 and Streptococcus β No. 80.

The antibacterial spectrum of bromoanhydro-12a-bromo-12a-deoxydedimethylaminotetracycline, representing the amount required to inhibit the growth of various typical bacteria, was determined in a standard manner by the agar dilution streak technique which is commonly used in testing new antibiotics. The minimal inhibitory concentration expressed in gammas per milliliter of this compound against various test organisms is reported in the table below. For comparison purposes, the antibacterial spectrum of tetracycline and of anhydrotetracycline against the same organisms is also included.

| Organism | Tetracycline Hydrochloride | Bromoanhydro-12a-bromo-12a-deoxydedimethylaminotetracycline | Anhydrotetracycline |
|---|---|---|---|
| Mycobacterium smegmatis ATCC 607 | 1.6 | 31.3 | 3.9 |
| Staphylococcus aureus 209P | 0.8 | <1.0 | 3.9 |
| Sarcina lutea 1001 | 1.6 | <1.0 | 3.9 |
| Bacillus subtilis ATCC 6633 | 0.8 | <1.0 | 2.0 |
| Streptococcus pyogenes C203 | 0.8 | 4.0 | 4.0 |
| Streptococcus γ No. 11 | >50 | 4.0 | 8.0 |
| Staphylococcus albus No. 69 | 50 | 2.0 | 4.0 |
| Streptococcus β No. 80 | >50 | 4.0 | 8.0 |
| Staphylococcus aureus NY 104 | 1.6 | 2.0 | 4.0 |
| Bacillus cereus No. 5 | 0.8 | <1.0 | 2.0 |

It will be observed from the above table that the compound of this invention is particularly effective against the strains of bacteria which are resistant to tetracycline and that the new compound is superior to anhydrotetracycline.

The invention will be described in greater detail in conjunction with the following specific examples.

EXAMPLE 1

*12a-bromo-12a-deoxydedimethylaminotetracycline*

Three hundred eighty-five milligrams of 12a-deoxydedimethylaminotetracycline (prepared by treating tetracycline with zinc dust in glacial acetic acid for 72 hours) and 177 milligrams of N-bromo-succinimide are combined in 25 milliliters chloroform. The solution is filtered. The filtrate is permitted to stand at room temperature for a few days. The crystalline product which forms during this time is filtered and washed with chloroform and ether and then dried at 60° C. Weight: 360 milligrams. The product is recrystallized by suspending the crystals in alcohol and adding enough methyl cellosolve at reflux temperature to make a complete solution. The solution is treated with activated carbon and filtered. The filtrate is diluted with about ⅔ its volume of water to which two milliliters of 6 N HCl is added. The product crystallizes as light yellow needles.

*Analysis.*—Calculated for $C_{20}H_{18}NO_7Br$: C, 51.7; H, 3.88; N, 3.02; Br, 17.25. Found: C, 52.09; H, 4.27; N, 2.86; Br, 17.34.

EXAMPLE 2

*11a,12a-dibromo-12a-deoxydedimethylaminotetracycline*

Three hundred eighty-five milligrams of 12a-deoxydedimethylaminotetracycline (prepared by treating tetracycline with zinc dust in glacial acetic acid for 72 hours) is taken up in 25 milliliters of reagent grade chloroform. The small amount of undissolved material goes completely in solution upon the addition of 354 milligrams of N-bromosuccinimide. Shortly thereafter, a light amorphous material precipitates out. When the flask is shaken over a period of an hour, most of the precipitate redissolves. The color of the solution is dark yellow. The flask is kept at room temperature overnight, during which time a crystalline substance appears on the walls of the flask. After a few days under refrigeration the crystals are filtered off and washed with a little chloroform and ether, and then dried over a pistol dryer at 60° C. Weight 130 milligrams. This product is recrystallized twice from methyl cellosolve and N/10 HCl.

*Analysis.*—Calculated for $C_{20}H_{17}NO_7Br_2$: C. 44.2; H, 3.13; N, 2.57; Br, 29.4. Found: C, 44.45; H, 3.46; N, 2.58; Br. 28.51.

EXAMPLE 3

*Anhydro-12a-bromo-12a-deoxydedimethylaminotetracycline*

One hundred thirty milligrams of 12a-bromo-12a-deoxydedimethylaminotetracycline are dissolved in 15 milliliters of glacial acetic acid at steam bath temperature. The solution is treated with activated carbon and filtered. The light yellow filtrate is treated with one milliliter of a 30% HBr solution in acetic acid and the color changes to orange red. After heating the reaction solution on the steam bath for a few minutes anhydro-12a-bromo-12a-deoxydedimethylaminotetracycline crystallizes out. The product is filtered, washed with acetic acid and ether and dried at 60° C. in the pistol dryer for one hour. Weight: 110 milligrams. The compound is recrystallized from dimethylformamide and methanol.

*Analysis.*—Calculated for $C_{20}H_{16}NO_6Br$: C, 54.3; H, 3.61; N, 3.14; Br, 17.95. Found: C, 53.79; H, 3.80; N, 3.09; Br, 17.38.

EXAMPLE 4

*Bromoanhydro-12a-bromo-12a-deoxydedimethylaminotetracycline*

Four hundred forty-six milligrams of anhydro-12a-bromo-12a-deoxydedimethylaminotetracycline and 177 milligrams of N-bromosuccinimide are suspended in 20 milliliters reagent chloroform. To the reaction mixture are added an additional 177 milligrams of N-bromosuccinimide and 20 milliliters chloroform. After shaking at room temperature for four hours there is almost a complete solution. The solution is clarified by filtration and the filtrate is concentrated to dryness. The residue is dissolved in dimethylformamide and the product crystalizes. It is isolated, washed with methanol and dried in the pistol dryer at 60° C. to yield bromoanhydro-12a-bromo-12a-deoxydedimethylaminotetracycline. Weight: 250 milligrams.

*Analysis.*—Calculated for $C_{20}H_{15}NO_6Br_2$: C, 45.7; H, 2.86; N, 2.64; Br, 30.5. Found: C, 44.9; H, 2.94; N, 2.57; Br, 33.37.

EXAMPLE 5

*Bromoanhydro-12a-bromo-12a-deoxydedimethylaminotetracycline*

Two hundred-fifthy milligrams of 11a,12a-dibromo-12a-deoxydedimethylaminotetracycline are dissolved in 15 cc. glacial acetic acid by heating on the steam bath. Part of the total solids dissolved are recrystallized out. The crystals are separated by filtration. The filtrate is treated with approximately 1–2 cc. of a solution of hydrobromic acid in acetic acid and the solution is heated on the steam bath. The color changes from yellow to red and the product crystallizes out. It is filtered, washed with ether and dried at 60° in the pistol dryer. Weight: 30 milligrams. The compound is identical to the product of Example 4 as confirmed by spectral analyses.

This application is a continuation-in-part of our co-pending application Serial Nos. 693,019 and 693,020 filed October 29, 1957, both now abandoned.

We claim:

1. Bromoanhydro-12a-bromo-12a-deoxydedimethylaminotetracycline, said bromoanhydro-12a-bromo-12a-deoxydedimethylaminotetracycline being derived by contacting 11a,12a-dibromo-12a-deoxydedimethylaminotetracycline with an acidic dehydrating agent in an inert organic solvent at a temperature of from about 0° C. to about 100° C.

2. Anhydro - 12a - bromo - 12a - deoxydedimethylaminotetracycline of the formula:
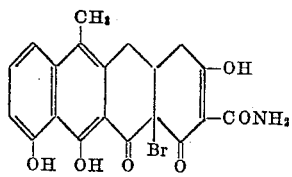
3. 12a - bromo - 12a - deoxydedimethylaminotetracycline of the formula:
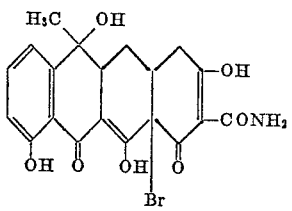
4. 11a,12a - dibromo - 12a - deoxydedimethylaminotetracycline of the formula:
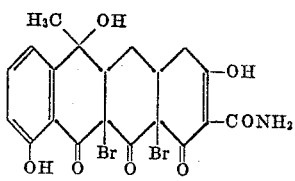
References Cited in the file of this patent
UNITED STATES PATENTS
2,736,725     Ritter _____ Feb. 28, 1956
FOREIGN PATENTS
84,144     Denmark _____ Aug. 26, 1957
OTHER REFERENCES
Stephens et al., J. Am. Chem. Soc., vol. 76, pages 3570–5 (1954).